UNITED STATES PATENT OFFICE.

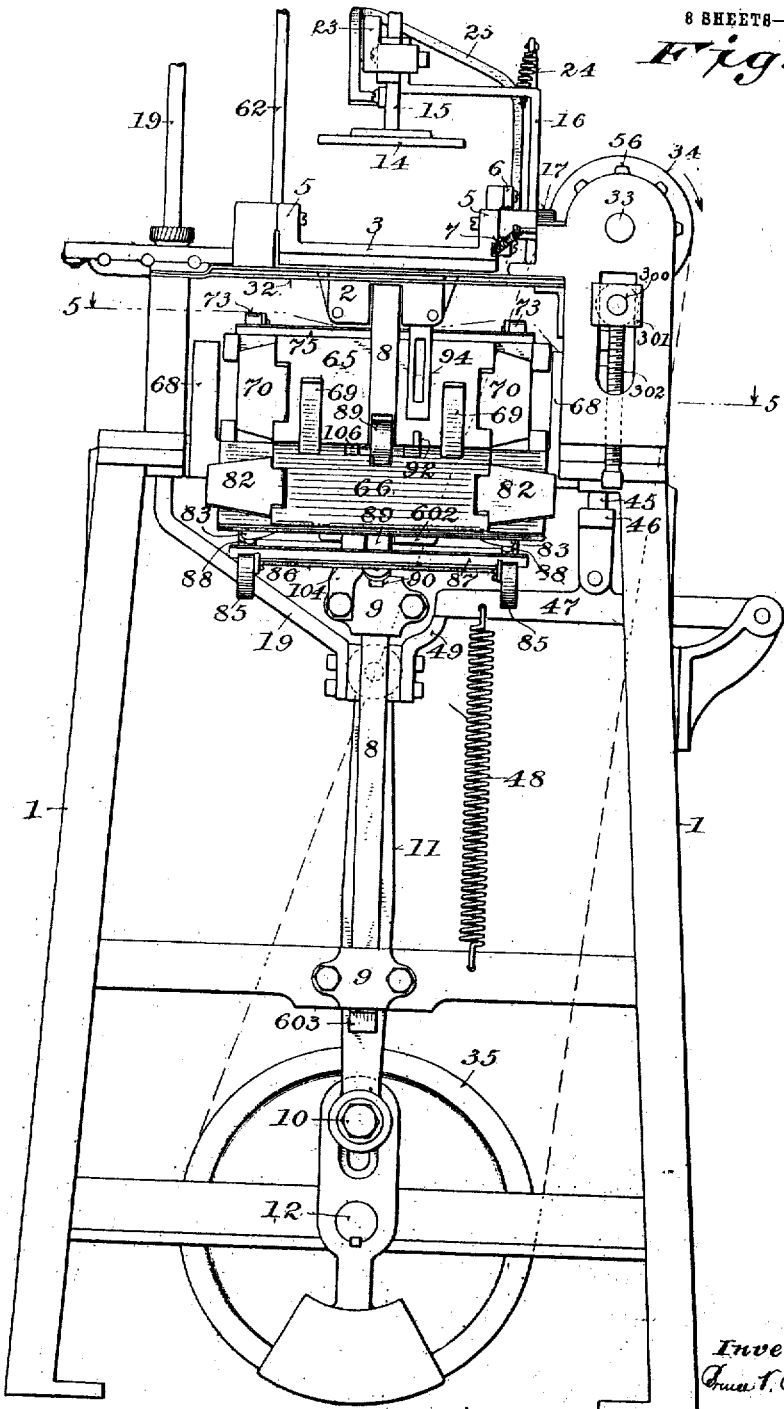

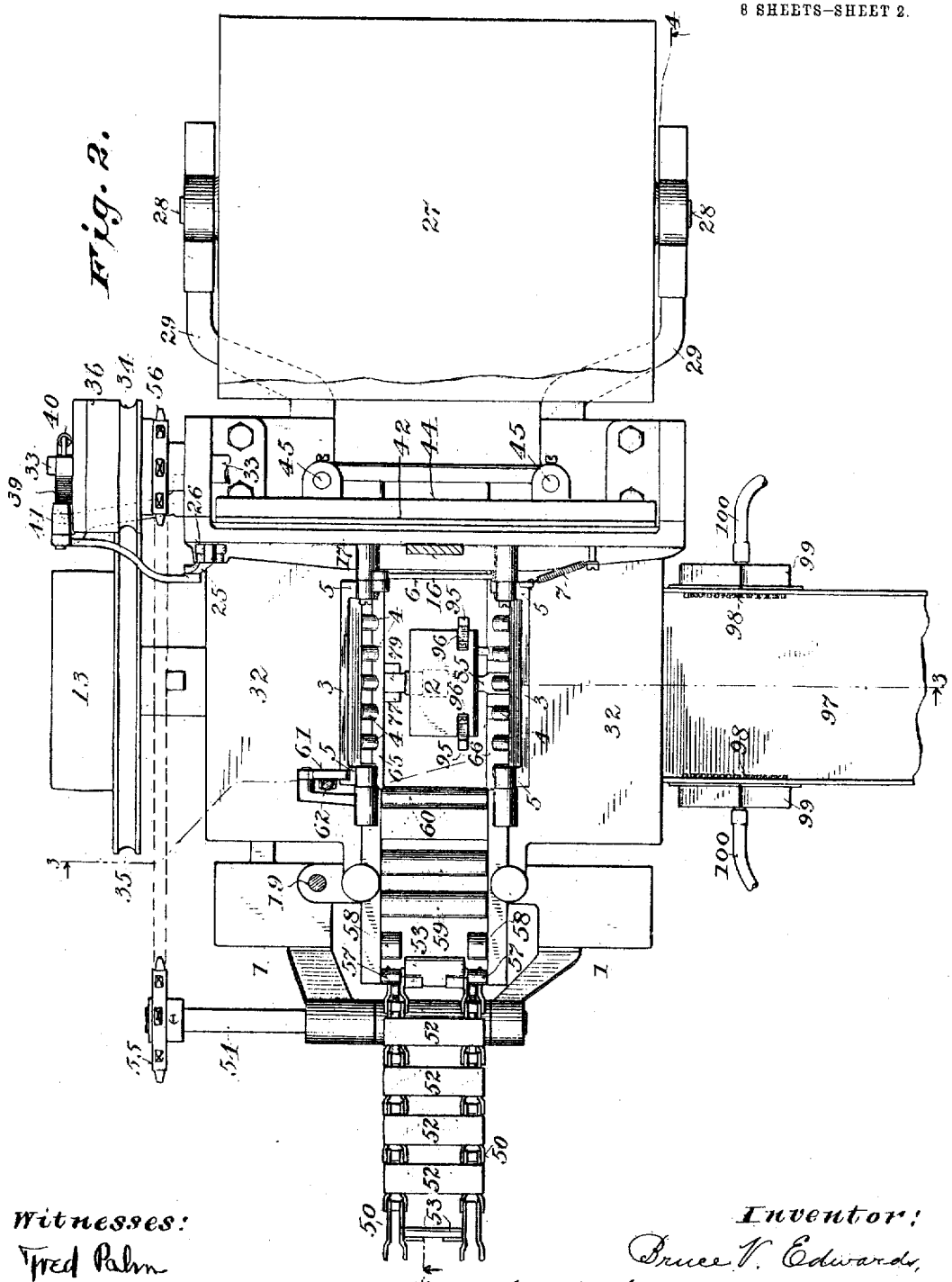

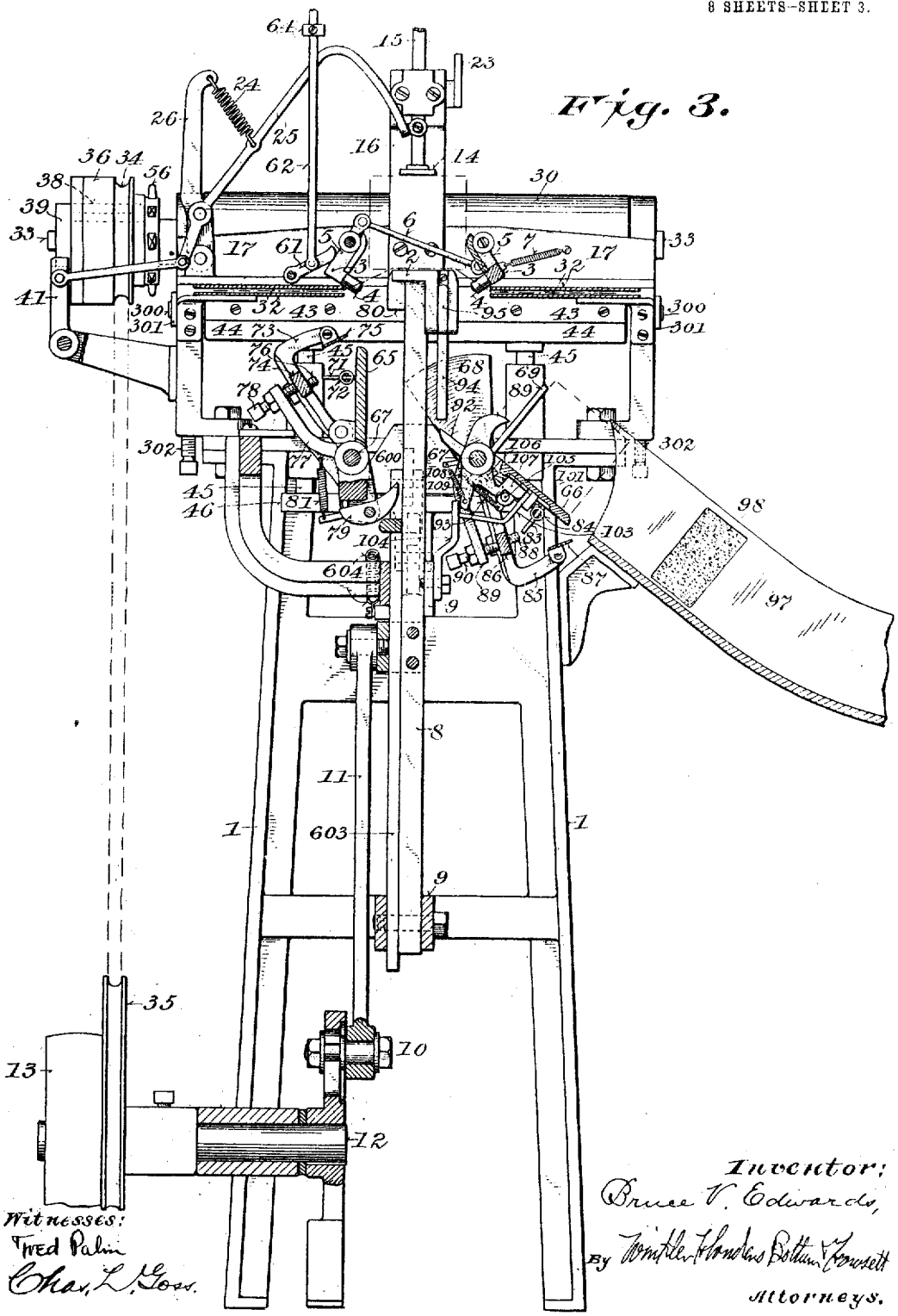

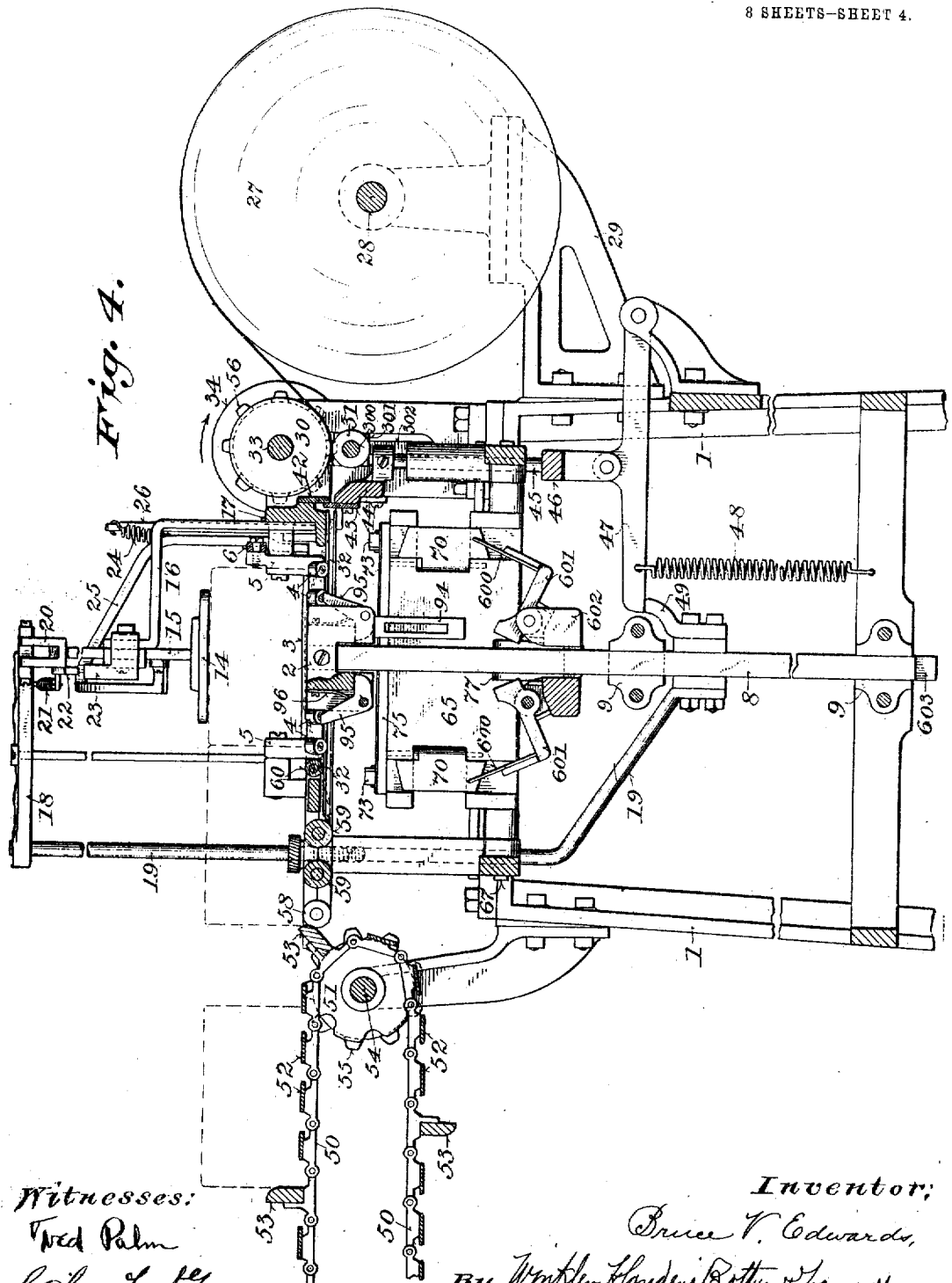

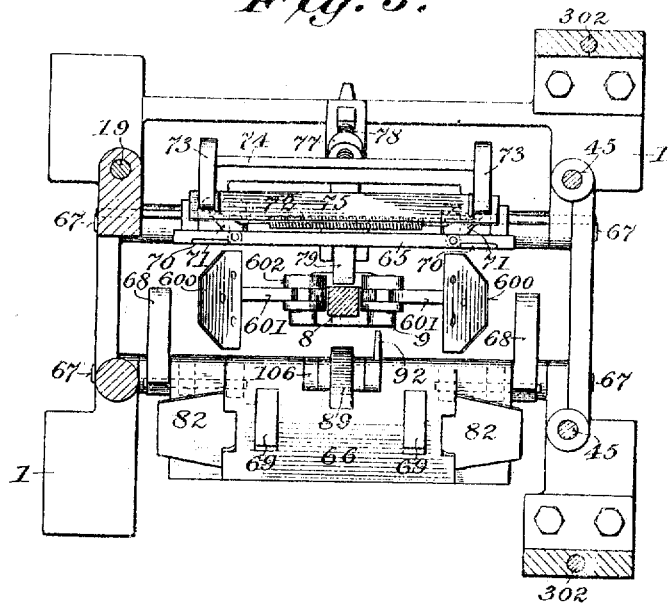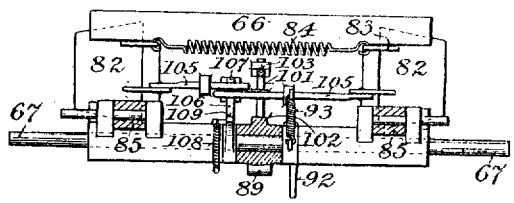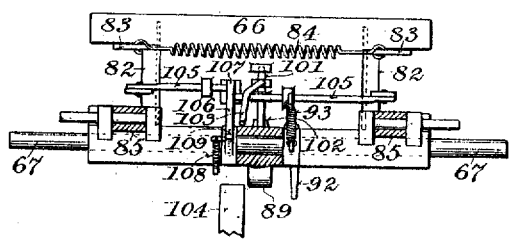

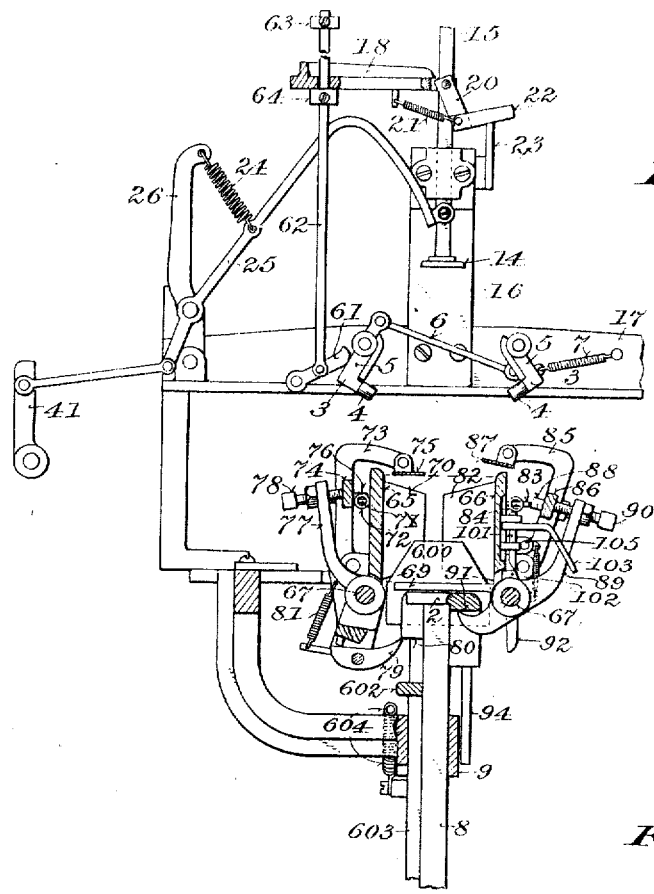

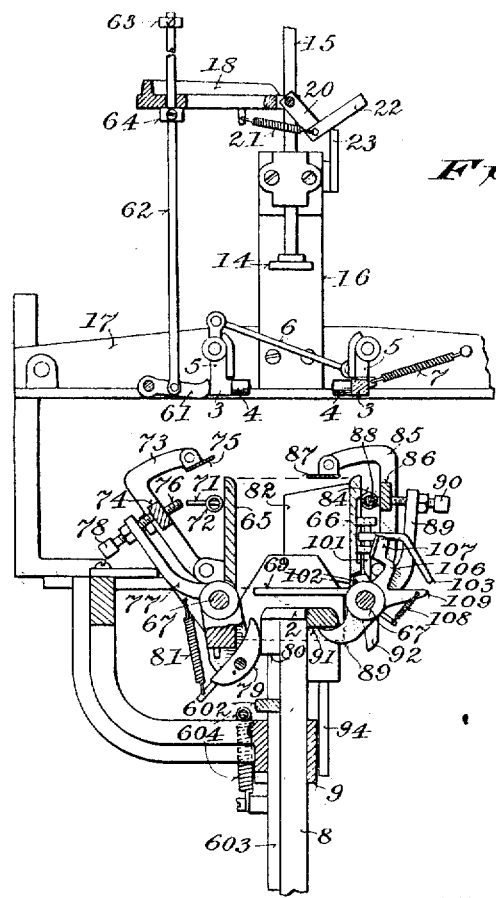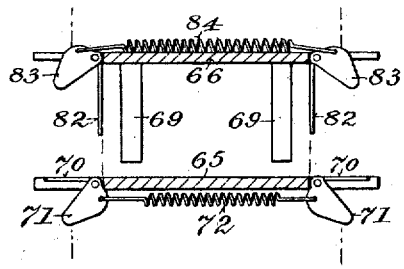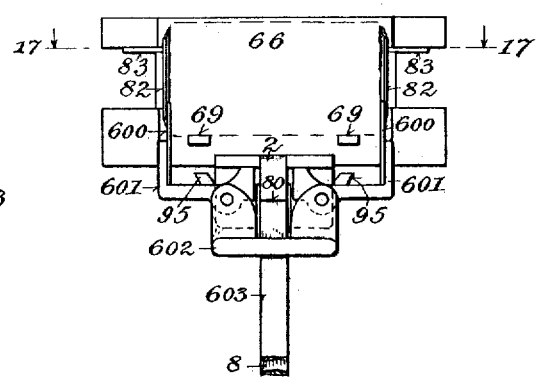

BRUCE V. EDWARDS, OF BAYONNE, NEW JERSEY.

WRAPPING-MACHINE.

1,023,824.

Specification of Letters Patent. Patented Apr. 23, 1912.

Application filed April 9, 1909. Serial No. 488,794.

*To all whom it may concern:*

Be it known that I, BRUCE V. EDWARDS, a citizen of the United States, residing at Bayonne, in the county of Hudson and State of New Jersey, have invented certain new and useful Improvements in Wrapping-Machines, of which the following is a specification, reference being had to the accompanying drawing, forming a part thereof.
This invention relates more particularly to machines for wrapping rectangular prints, bricks or cakes of butter, cheese, soap and other similar molded material, or articles or packages of various shapes, with paper or the like. Its main objects are to automatically, rapidly and effectively wrap materials or articles of this kind, and generally to improve the construction and operation of machines of this class.
It consists in the construction, arrangement and combinations of parts as hereinafter particularly described and claimed.

In the accompanying drawings like characters designate the same parts in the several figures.

Figure 10:
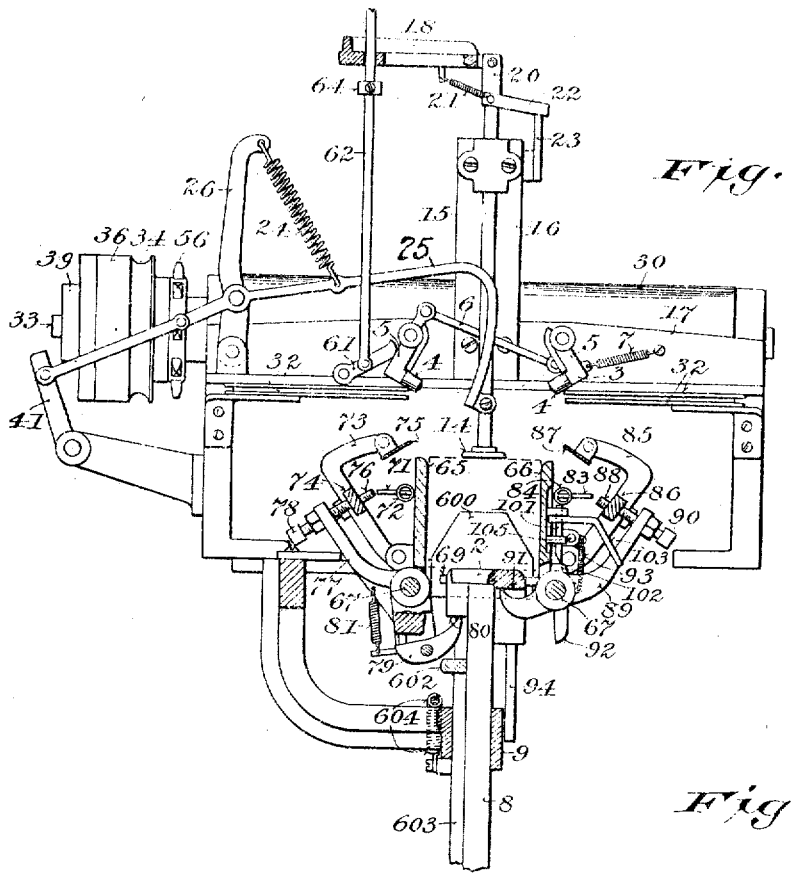
Figure 11:
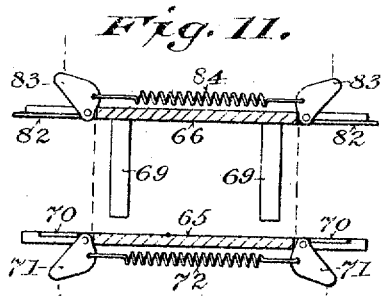
Figure 12:
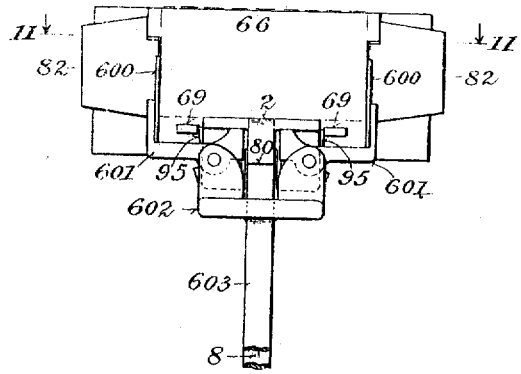

Figure 1 is a front elevation of a machine embodying the invention; Fig. 2 is a plan view; Fig. 3 is a vertical transverse section on the line 3 3, Fig. 2; Fig. 4 is a vertical longitudinal section on the line 4 4, Fig. 2; Fig. 5 is a horizontal section on the line 5 5, Fig. 1; Fig. 6 is a detail view showing the front folding leaf closed and its end folding flaps open; Fig. 7 is a view similar to that of Fig. 6, but showing the end flaps closed; Fig. 8 is an end elevation, as viewed from the left relative to Fig. 3, of the clutch for intermittently operating the conveyer and the paper feed roller; Fig. 9 is a sectional detail view of said clutch; Fig. 10 is a vertical transverse section showing the carrier and follower descending with a cake or package (indicated by dotted lines), the front folding leaf and the bottom end flaps closed, and the front and rear end flaps and the top flaps open; Figs. 11 and 12 are detail views showing the flaps in corresponding positions, Fig. 11 being a horizontal section on the line 11 11, Fig. 12, and Fig. 12 a rear elevation of the carrier, front leaf and bottom and front end flaps, the rear leaf being omitted; Fig. 13 is a section similar to Fig. 10, but showing the carrier in a somewhat lower position, the follower withdrawn, the rear-top and end-flaps closed and the front-top and end-flaps closing; Figs. 14 and 15 are views similar to Figs. 11 and 12 respectively, but corresponding with Fig. 13 as to the positions of the parts shown, Fig. 14 being a horizontal section on the line 14, 14, Fig. 15; Fig. 16 is a section similar to Figs. 10 and 13, but showing the carrier in its lowest position and all the folding flaps except the rear-top and end-flaps closed; and Figs. 17 and 18 are views similar to Figs. 14 and 15 respectively, but corresponding with Fig. 16 as to the positions of the parts shown, Fig. 17 being a horizontal section on the line 17, 17, Fig. 18.

Referring to the more general views of the drawing, Figs. 1 to 5 inclusive, showing a machine designed more particularly for wrapping rectangular prints or cakes of butter, cheese, soap or the like, on the upper part of a suitable frame 1, are mounted at the sides of an opening, movable or retreating rests for temporarily supporting the cakes one at a time in position to be transferred or conveyed by a reciprocating or vertically movable carrier 2, to wrapper folding mechanism located below. These rests may consist of two parallel bars 3, provided on their inner sides with a series of inwardly projecting rollers 4 and pivoted by upturned arms 5 at their ends to the frame. The rests are connected by a link 6 pivoted to one above and to the other below the axis on which it swings, so that the movement of one in or out will produce a corresponding movement of the other. A spring 7 connecting one of the rests with the frame, tends to swing them outwardly away from each other, as shown in Fig. 3. The carrier 2 is mounted on the upper end of a bar 8 which is supported and guided by bearings 9. A reciprocating movement is imparted to the carrier by an adjustable crank 10 connected therewith by a pitman 11 and mounted on a shaft 12, which is supported in a suitable bearing in the lower part of the frame and is provided with a driving pulley 13.

Above and in line with the carrier 2, a vertically movable follower 14 mounted on the lower end of a rod or bar 15 is supported and guided by said rod or bar in an overhanging standard or bracket 16, which is attached to a cross bar 17 of the frame. The follower is moved downward with the carrier 2 by a horizontal arm 18 carried by the upper end of a vertically sliding rod 19 guided in the frame and attached at its lower end to the carrier bar 8. A loop or U-shaped dog 20 pivoted in the overhanging end of the arm 18 in line with the follower rod 15, is connected by a spring 21 with said arm and is provided with a laterally projecting trip arm 22. The spring 21 is arranged to pull and hold the lower closed end of the dog over the upper end of the follower rod 15, as shown in Figs. 4 and 10 when the arm 18 is brought to the upper limit of its movement, and the arm 22 is arranged by engagement with a fixed stop 23 on the bracket 16 to throw the lower end of the dog against the tension of the spring 21 out of engagement with the upper end of the rod 15, when the arm 18 approaches the lower limit of its movement, as shown in Fig. 13, thus allowing the rod 15 to pass upwardly between the sides of the dog. The follower is withdrawn upward when released, and is held normally in its upper position, as shown in Fig. 3, by a spring 24, connected with a lever 25, which is pivoted at one end to the follower rod, and is fulcrumed to a link or standard 26, which is pivoted at its lower end to the frame and with the upper end of which the spring 24 is connected.

The machine is supplied with wrappers from a roll 27 of paper or other suitable material rotatably mounted on a horizontal shaft 28, which is carried by brackets 29 on one side of the frame. The paper is fed by the rollers 30 and 31 between parallel horizontal guides 32 just below the rests 4. The shaft 300 of the lower roller 31 is journaled in vertically adjustable boxes 301, which are adjusted as required by vertical screws 302 threaded in the frame of the machine.

On one end of the upper feed roller shaft 33 is mounted a pulley 34, which is connected by a belt with a driving pulley 35 on the shaft 12. The pulley 34 is formed with or attached to one member 36 of a clutch for intermittently connecting the pulley and feed roller. The outer member 36 of the clutch is fitted to turn on the inner member 37, as shown in Figs. 8 and 9, the inner member being fixed on the roller shaft 33. A semi-cylindrical locking pin 38 is fitted in a corresponding recess formed in the inner member 37 parallel with the axis of the clutch, and is provided at its outer end with a wiper arm 39. A corresponding recess is formed in the bore of the outer member 36, into which the locking pin is turned as indicated by dotted lines, by a spring 40 when the wiper arm 39 is released and the recess in the outer member is turned into register with the recess in the inner member, as hereinafter explained.

A trip arm 41 pivoted to a bracket on the rear side of frame 1 and connected by a link with the lever 25, as shown in Figs. 3 and 10, is held normally by the spring 24 in the path of the wiper arm 39, which engaging with said trip arm as shown in Fig. 8, holds the locking pin 38 as shown by full lines in Fig. 9, entirely within the recess of the inner clutch member 37, so that the outer clutch member 36 is free to turn thereon until the trip arm 41 is displaced and the wiper arm 39 is released, as shown in Fig. 10.

The paper for the wrappers is severed by a cutter consisting of blades 42 and 43, the blade 42 being attached to the cross piece 17 above the path of the paper from the rollers 30 and 31 to the guides 32, and the blade 43 being attached to a vertically movable cross head 44, which is mounted on the upper ends of rods 45 guided in the frame and connected at their lower ends by a bar 46. A lever 47 fulcrumed at one end to a bracket on one side of the frame 1, is connected with the cross bar 46, and by a spring 48 with a part of the frame below. The inner end of the lever 47 extends into the path of a lug 49 on the carrier bar 8, this lug being arranged to engage with said lever and to thrust the movable blade 43 upward across the path of the paper when the carrier 2 nears the upper limit of its movement, as shown in Fig. 4. As the carrier descends, the spring 48 withdraws the blade 43 from the fixed blade 42 below the path of the paper. On the opposite side from the rollers 30 and 31 the machine is provided with a conveyer for delivering the cakes or articles to be wrapped to the rests 4 in position to be transferred therefrom by the carrier 2 to the folding mechanism below. This conveyer may consist as shown, of a pair of link belts 50 mounted on sprocket wheels 51 and connected by cross slats 52 and at suitable intervals by propelling flights 53. The shaft 54 of the sprocket wheels 51 at the end of the conveyer next to the machine, is provided as shown in Fig. 2, with a sprocket wheel 55 which is connected by a link belt with a sprocket wheel 56 fixed on the shaft 33 of the roller 30.

Between the laterally movable rests 4 and the adjacent end of the conveyer, a series of rollers 57, 58, 59 and 60 are mounted in the upper part of the frame 1 in position to receive the cakes from the conveyer and deliver them upon said rests when they are swung inward and held in operative position, as shown in Fig. 16. The rests are swung toward each other and locked in operative position by a detent 61 pivoted to a part of the frame in position to coöperate with the upturned arm 5 at one end of one of the rest bars 3. This detent is actuated by a rod 62 pivoted thereto at its lower end, passing loosely through the arm 18 and provided above and below said arm with adjustable tappets or collars 63 and 64, as shown in Figs. 13 and 16.

The folding mechanism comprises parallel side leaves or plates 65 and 66, mounted adjacent to their lower edges as shown in Figs. 3 and 4, on horizontal rods 67 below and parallel with the rest bars 3 and on opposite sides of the path of the carrier 2, and bottom end flaps or folders 600, carried by the outer ends of vertically swinging levers 601, which are fulcrumed in a vertically movable head 602, between and transversely to the leaves 65 and 66. The head 602 is mounted on the end of a vertical bar 603, which is supported and guided with the carrier bar 8 in the bearings 9, the bar 8 passing upwardly through a recess in the front side of said head between the inner ends of the levers 601, as shown in Figs. 4 and 5. A spring 604 connecting the bar 603 with a part of the frame above, holds said head normally in its upper position, as shown in Figs. 3 and 10. The rear leaf or plate 65 is fixed in a vertical position, while the front leaf or plate 66 is capable of opening or turning outwardly and downwardly from a vertical position in which it normally stands. At its ends it is provided with counterweights 68 which tend to turn it into and hold it in an upright position. It is also provided on its inner side and adjacent to its lower edge with transverse package supporting and discharging arms 69, which are spaced apart so as to permit the carrier 2 to pass between them when the leaf or plate 66 to which they are attached, is in an upright position. The rear leaf or plate is provided with laterally swinging end flaps or folders 70, vertically hinged thereto adjacent to its ends and provided with closing cams 71, which project from the outer side of the leaf or plate and are connected by a spring 72, which tends to swing said flaps or folders outward and to hold them against the inner face of said leaf or plate.

To the inwardly bent upper ends of arms 73, which are connected with each other by a longitudinal bar 74 and are hinged at their lower ends to the rear or outer side of the leaf 65, is attached parallel with said leaf, a top flap or folder 75, in a position to pass over the upper edge of said leaf when the arms are swung forward and to fold one side of the wrapper over the top of a cake or package held between the leaves 65 and 66. The arms 73 are provided with adjusting screws 76, arranged to engage with the cams 71 and to close the end flaps 70 when said arms are swung inward or forward in closing the top flap 75. A lever 77 mounted on the rear rod 67 in a recess in the lower part of the leaf 65, is provided at its upper end with an adjusting screw 78, arranged by engagement with the connecting bar 74 to swing the arms 73 with the top flap 75 inward or forward. In the lower end of the lever 77 is pivoted a dog 79, the point or inner end of which projects normally into the path of a shoulder 80 on the under side of the carrier 2. A spring 81 connecting the outer or rear end of the dog with a part of the lever above it, permits the inner or front end of the dog to yield upwardly so as to permit the carrier 2 to pass it, when the leaf 65 and the lever 77 are swung back, as shown in Fig. 16. The front leaf or plate 66 is provided on the inner side adjacent to its ends, with flaps or folders 82, hinged thereto and provided on the outer side of the leaf with closing cams 83, connected by a spring 84 which tends to open and hold said flaps against the inner side of said leaf, as shown in Figs. 1, 5 and 6. To the inwardly or rearwardly bent upper ends of arms 85 which are connected by a bar 86 and are pivoted at their lower ends to the outer side of said leaf, is attached a top flap or folder 87, like or similar in construction and operation to the flap or folder 75 on the rear leaf. The arms 85 are provided with adjusting screws 88 for closing the end flaps 82 by engagement with the cams 83 when said arms are swung toward the leaf 66.

The top flap or folder 87 and with it the end flaps 82, are closed by a lever 89 fulcrumed on the front hinge rod 67 and provided at one end with an adjusting screw 90 in position to engage with the connecting bar 86 of the arms 85. The opposite end of this lever projects when the leaf 66 stands in an upright position, into the path of a shoulder 91 on the under side of the carrier 2, as shown in Figs. 10, 13 and 16.

To insure the return of the leaf 66 to an upright position at the proper time after it has been turned forward into discharging position, as shown in Fig. 3, a dog 92 pivoted on the front hinge rod 67, is held normally by a spring 93 connecting it with a lug on the outer side of said leaf, in position to coöperate with a slotted arm 94 extending downwardly from the carrier 2. In the descent of the carrier from its upper position, the arm 94 engaging with the arm 92, will turn said leaf up far enough to insure its return to an upright position by the counterweights 68.

To turn the leaf 66 with its arms 69 outward from its upright folding position as shown in Figs. 10, 13 and 16, into discharging position as shown in Fig. 3, dogs 95 are pivoted in the vertically recessed ends of the carrier 2, and they are yieldingly held as shown in Fig. 4, by springs 96, with their upper ends projecting therefrom in position as shown in Figs. 15 and 18, to engage with the under side of the arms 69 when the carrier moves upward from its lower position.

In passing downward between said arms the dogs are pressed back by them into the recesses in the carrier against the tension of the springs, which immediately thrust them out into operative position as soon as the arms are cleared.

The machine is provided on the front side with an inclined delivery chute 97, in position to receive the wrapped cakes or packages as they are discharged from the leaf 66. The sides of the chute at its upper end are extended as shown in Fig. 3, to embrace the upper outer corners of a package when it is turned with the plate 66 and arms 69 into discharging position, and to fold the ends of the wrapper at the top of the package over the folds previously formed by the end flaps 600, 70 and 82.

Brushes 98 are provided in the sides of the delivery chute as shown in Figs. 2 and 3, to dampen the wrappers at the ends of the packages as they slide down the chute and thus cause the end folds to stick together and to the butter or other material, sufficiently to prevent their unfolding when the packages are removed from the chute. The brushes project slightly through openings in the sides of the chute and are inclosed outside by boxes 99 which are connected by hose or pipes 100, as shown in Fig. 2, with a source of water or other liquid supply (not shown).

In order to hold the end folds of the wrappers in place till the upper front corners of the packages pass between the sides of the chute and the last end folds are turned down thereby, the front end flaps 82 and the front top flap 87 are held closed, while the leaf 66 is being turned from its upright position to discharging position, as shown in Fig. 3. To accomplish this, the leaf 66 is provided as shown in Figs. 3, 6, 7, 10 and 16, on its outer or front side, with a vertically or transversely sliding gravity bolt or catch 101, which when the lever 89 is turned up into position to close the top flap 87, as shown in Fig. 16, drops in front of a lug 102 on the hub of said lever, locking it to said leaf with its top and end flaps closed. The bolt or latch is provided with an outwardly and downwardly projecting arm 103, which by engaging with a fixed stop 104, attached to the upper bearing 9, withdraws said bolt or latch from the lug 102 when the leaf 66 is turned down, as shown in Fig. 3, thereby releasing said lever and the arms 85 and permitting the top flap 87 to drop below the bottom of the chute 97.

To hold the end folds formed by the flaps 82 in place after the flap 87 is released and until such folds are caught and held by the folds formed by the sides of the chute 97, locking rods 105 are pivoted to outwardly projecting arms on the flaps 82 and are movable lengthwise in guides or keepers on the outer or front side of the leaf 66. A catch 106 pivoted on the front hinge bar 67 is formed with a tongue 107, which is thrown outward by a spring 108 between the inner separated ends of the rods 105 when the flaps 82 are closed, thereby locking and holding them in that position, as shown in Fig. 7, until the tail 109 of the catch engages the stop 104, as shown in Fig. 3, thereby forcing the tongue 107 back toward the leaf 66 and releasing the rods 105 with the flaps 82, which are thereupon thrown open by the spring 84, as shown in Fig. 6. The arm 103 of the bolt or catch 101 is made to engage with the stop 104 and release the top flap 87 before the tail 109 of the catch 106 is brought into contact with said stop to release the end flaps 82.

The machine operates as follows: A wrapper having been fed by the roller 30 into the guides 32 above the carrier 2 and severed by the cutter 43 from the roll, and a cake of butter or the like having been deposited as indicated by dotted lines, Figs. 3 and 4, upon the movable rests 4 while they are in the position shown by Fig. 16, the carrier 2 is lifted by the crank 10 to its upper position, and just before it reaches the upper limit of its movement the arm 18 engaging with the upper tappet 63 on the rod 62, lifts the detent 61 and releases the rests 4 which are then withdrawn by the spring 7, leaving the cake with its wrapper upon the carrier. As the arm 18 is brought to the upper limit of its movement, the dog 20 is drawn by the spring 21 over the upper end of the follower rod 15, as shown in Figs. 4 and 10. The carrier 2 and the follower 14 now descend together with the downward movement of the crank 10, carrying the cake with its wrapper between them, to the wrapper folding mechanism, the parts of which at first have the positions shown in Figs. 1, 3, 4 and 5. In the initial downward movement of the carrier 2 the arm 94 by engagement with the dog 92 turns the leaf 66 up, in case this has not been done before by the counterweights 68 which tend to turn it back to and hold it in an upright position, as shown in Fig. 10, after it has been turned down to discharge a package. The leaves 65 and 66 fold and hold the wrapper against the sides of the cake as the latter passes down between them, and the carrier 2 as it comes to the position shown in Figs. 10 and 12, engaging with the inner ends of the levers 601 turns the flaps 600 up into the position shown in Fig. 12, folding portions of the ends of the wrapper from the bottom against the ends of the cake. The carrier 2 in its further movement downward from the last mentioned position, takes the head 602 and flaps 600 along with it. The shoulders 80 and 91 on the underside of the carrier 2 being now brought into contact with the lower end of the lever 89 and the dog 79 at the lower end of the lever 77, as shown in Fig. 10, the movement of the carrier a short distance farther downward throws the upper ends of said levers inward and closes the top flaps 75 and 87, as shown in Fig. 13, and the rear and front end flaps 70 and 82, as shown in Fig. 14, the rear top and end flaps 75 and 70 closing slightly in advance of the front top and end flaps 87 and 82. The wrapper is thus folded over and lapped upon the top of the cake by the flaps 75 and 87, and quarter folds are laid across the ends over the closed bottom end folding flaps 600 by the flaps 71 and 82. As the carrier 2 descends from the position shown in Fig. 10 to the position shown in Fig. 13, the cake is left standing on the arms 69, and the arm 22 engaging the stop 23, as shown in Fig. 16, turns the dog 20 out of engagement with the upper end of the follower rod 15. The follower 14 being thus released, is instantly withdrawn to its upper position by the spring 24. In passing below the arms 69 the dogs 95 yield inwardly to clear them and are then thrown out by the springs 96 into position, on the return of the carrier upward, to engage and turn the arms 69 with the package thereon upward and forward.

In descending from the position shown in Fig. 13 to the position shown in Fig. 16, the shoulder 80 clears the point of the dog 79, permitting it to turn upwardly with its curved face against the opposing vertical face of the carrier, as shown in Fig. 16, and allowing the lever 77 and the rear top flap 75 to swing back away from the rear leaf 65. This releases the rear end flaps 70, which are opened or turned out and back by the spring 72 against the leaf 65, as shown in Fig. 17. Immediately following the release and opening of the rear flaps 70 and 75, the front flaps 82 and 87 are completely closed as shown in Figs. 16 and 17, by the further descent of the carrier 2 with its shoulder 91 in engagement with the lever 89. When this occurs, the gravity latch 101 drops behind the lug 102 on the hub of lever 89, and the tongue 107 of the latch 106 is thrown by the spring 108 out between the separated inner ends of the rods 105, as shown in Figs. 7 and 16, thereby locking the front top and end flaps 87 and 82 in their closed positions. The carrier 2 now begins to ascend and the dogs 95 engaging with the arms 69, turn them and the front leaf 66 with the wrapped package upward and forward into the position shown in Figs. 1, 3 and 5, the front top and end flaps 87 and 82 remaining closed and holding the folds of the wrapper in place till the upper front corners of the package pass between the sides of the delivery chute 97, which fold the ends of the wrapper at the top of the package down over the previously laid end folds as the package slides from the leaf 66 into the chute. As the leaf 66 approaches the position shown in Fig. 3, the arm 103 of the latch 101 engaging the stop 104, withdraws said latch from the lug 102 on the hub of lever 89, releasing the flap 87 and permitting it to fall out of the way. Following this operation when the upper front corners pass between the sides of the chute sufficiently to retain the top and end folds of the wrapper in place, the tail 109 of the latch 106 engaging the stop 104, throws the latch tongue 107 out of engagement with the ends of the rods 105, permitting the spring 84 to open the flaps 82, as shown in Fig. 6. The dog 92 passes through the slot in the arm 94 when the leaf 66 is opened or turned forward to discharge a package as above explained, and yields upwardly to permit the lower end of said arm to pass it, springing back into the path of the arm as soon as the arm clears it, in the upward movement of the carrier 2.

As the wrapped prints or cakes of butter or the like, pass the brushes 98 at the sides of the delivery chute 97, the end folds of the wrappers are wet or moistened sufficiently to stick them to the butter or other material and prevent them from unfolding when they are removed from the chute and relieved from confinement. The arm 18 descending from the position shown in Fig. 13 to the position shown in Fig. 16, engaging with the lower tappet 64 on rod 62, turns down the detent 61, which in turn swings the rests 4 inward into position to receive and support another print or cake over the opening in the table or frame and above the carrier 2. When the follower 14 approaches the lower limit of its movement as shown in Fig. 10, the trip arm 41 is thrown by the lever 25 out of engagement with the wiper arm 39, thus releasing the locking pin 38 and permitting it to be turned by the spring 40 into the position indicated by dotted lines in Figs. 8 and 9, as soon as the recess in the outer clutch member 36 is brought into register with the corresponding recess in the inner member 37, as shown by Fig. 9. The clutch members thus locked together, the roller 30 is turned in the direction indicated by the arrow on Fig. 4, to feed the required length of paper for a wrapper into position between the guides 32 and between the carrier 2 and follower 14. The conveyer 50 is also advanced by its driving connection (shown in Fig. 2) with said roller 30, the required interval to deposit another print or cake on rollers 57, 58, 59 and 60 and push the cake ahead of it into position on the rests 4, as indicated by dotted lines in Fig. 4, to be wrapped by a repetition of the operations hereinbefore explained. As the carrier 2 approaches the upper limit of its movement the lug 49 engaging the lever 47 lifts the cutter blade 43 and severs the paper at the proper point for a wrapper of the required length.

Various changes in the construction and arrangement of parts of the machine may be made without materially affecting its principle or departing from the contemplated scope of the invention embodied therein.

I claim:

1. In a wrapping machine the combination of folding leaves or plates, folding flaps movable across said leaves or plates toward and from each other, and a carrier adapted to convey articles to be wrapped into position between said leaves or plates and provided with means for operating said flaps.

2. In a wrapping machine the combination of folding leaves or plates, folding flaps movable across said leaves or plates toward and from each other, a carrier adapted to convey articles to be wrapped into position between said leaves or plates and provided with means for operating said flaps, and means for removing packages from the wrapping mechanism.

3. In a wrapping machine the combination of folding leaves or plates, folding flaps movable across said leaves or plates toward and from each other, a carrier adapted to convey articles to be wrapped into position between said leaves or plates and provided with means for operating said flaps, delivery mechanism for removing wrapped packages from the machine, and means for sealing the wrappers on the packages.

4. In a wrapping machine the combination of folding leaves or plates, folding flaps movable across said leaves or plates toward and from each other, and folding flaps movable toward and from each other between and lengthwise of said leaves or plates, and a carrier adapted to convey articles to be wrapped into position between said leaves or plates and provided with means for operating said flaps.

5. In a wrapping machine the combination of side folding leaves or plates, top folding flaps movable across said leaves or plates toward and from each other, bottom and side-end folding flaps, and a carrier adapted to convey articles to be wrapped into position between said leaves or plates and provided with means for operating said flaps.

6. In a wrapping machine the combination of side folding leaves or plates, top folding flaps movable transversely over the upper edges of said leaves or plates toward and from each other, bottom and side-end folding flaps, a carrier adapted to convey articles to be wrapped into position between said leaves or plates and provided with means for operating said flaps, and means for removing wrapped packages from the wrapping mechanism.

7. In a wrapping machine the combination of folding leaves or plates, one of which is hinged and provided with transverse package supporting and discharging arms, top and side-end folding flaps hinged to said leaves or plates, swinging bottom-end folding flaps, a carrier adapted to convey articles to be wrapped into position between said leaves or plates and provided with means for operating the movable leaf or plate and said flaps, a catch for locking its top flap to the movable leaf or plate when it is opened, and a delivery chute arranged to receive packages from the movable leaf or plate and having sides adapted to turn the final end folds of the wrappers.

8. In a wrapping machine the combination of folding leaves or top plates, side-end and bottom-end folding flaps, a carrier adapted to convey articles to be wrapped into position between said leaves or plates and provided with means for operating said flaps, a delivery chute adapted to turn the final end folds of the wrappers, means for transferring the packages from the folding leaves or plates into said chute, and means for sealing the folds of the wrappers on the packages.

9. In a wrapping machine the combination of folding plates or leaves one of which is hinged to swing toward and from the other and is provided with transverse package supporting and discharging arms, top and side-end folding flaps hinged to said leaves or plates, swinging bottom-end folding flaps, a carrier adapted to convey articles to be wrapped into position between said leaves or plates and provided with means for operating the movable leaf or plate and said flaps, a catch for locking its top flap closed with relation to the movable leaf or plate when the latter is opened, a delivery chute arranged to turn the final folds of the wrappers as the packages are transferred thereto from the movable leaf or plate, and means for sealing the folds of the wrappers on the packages.

10. In a wrapping machine the combination of a retreating rest for temporarily supporting articles to be wrapped, wrapper folding mechanism located below said rest and comprising side leaves or plates and top flaps movable toward and from each other across said leaves or plates, and a carrier adapted to convey such articles from said rest to the folding mechanism below and provided with means for operating said flaps.

11. In a wrapping machine the combination of a rest for temporarily supporting articles to be wrapped, wrapper folding mechanism comprising side leaves or plates, one of which is hinged and provided with package supporting and discharging arms, and flaps movable toward and from each other across the space between said leaves or plates, and a carrier adapted to convey the articles from said rest to the folding mechanism below and provided with means for operating said hinged leaf and said flaps.

12. In a wrapping machine the combination of a rest for temporarily supporting articles to be wrapped, wrapper folding mechanism comprising leaves or plates and flaps movable toward and from each other across the space between said leaves or plates, a carrier adapted to convey the articles from said rest to the folding mechanism and provided with means for operating said flaps, means for removing the wrapped packages from the folding mechanism and means for sealing the folds of the wrappers.

13. In a wrapping machine the combination of a rest for temporarily supporting articles to be wrapped, wrapper folding mechanism comprising side leaves or plates, end flaps hinged thereto and top flaps movable toward and from each other across the space between said leaves or plates, a carrier adapted to convey the articles to be wrapped from said rest to the folding mechanism and provided with means for operating said flaps, means for removing packages from the folding mechanism and means for sealing the folds of the wrappers on the packages.

14. In a wrapping machine the combination of a rest for temporarily supporting articles to be wrapped, wrapper folding mechanism comprising side leaves or plates provided with hinged end flaps, top flaps movable toward and from each other across the space between said leaves or plates, and bottom-end flaps movable toward and from each other between and lengthwise of said leaves or plates, a carrier adapted to convey the articles from said rest to the folding mechanism and provided with means for operating said flaps, means for removing packages from the wrapping mechanism, and means for sealing the folds of the wrappers on the packages.

15. In a wrapping machine the combination of a rest for temporarily supporting articles to be wrapped, wrapper folding mechanism comprising side leaves or plates one of which is hinged and provided with package supporting and discharging arms, top flaps movable toward and from each other across the space between said leaves or plates, end flaps hinged to said leaves or plates, and bottom-end flaps movable toward and from each other between and lengthwise of said leaves or plates, a carrier adapted to convey the articles from said rest to the folding mechanism and provided with means for operating the hinged leaf or plate and the flaps, and a catch for locking the top flap of the hinged leaf or plate thereto when the latter is opened.

16. In a wrapping machine the combination of a rest for temporarily supporting articles to be wrapped, wrapper folding mechanism comprising side leaves or plates, end flaps hinged to said leaves or plates, top flaps movable toward and from each other across the space between said leaves or plates, and bottom-end flaps movable toward and from each other between and lengthwise of said leaves or plates, a carrier adapted to convey the articles from said rest to the folding mechanism and provided with means for operating said flaps, and means for removing packages from the folding mechanism.

17. In a wrapping machine the combination of a rest for temporarily supporting articles to be wrapped, wrapper folding mechanism comprising side leaves or plates one of which is hinged and provided with package supporting and discharging arms, end flaps hinged to said leaves or plates, top flaps movable toward and from each other across the space between said leaves or plates, and bottom-end flaps movable toward and from each other between and lengthwise of said leaves or plates, a carrier adapted to convey the articles to be wrapped from said rest to said folding mechanism and provided with means for operating said flaps, a catch for locking the top flap of the hinged leaf or plate thereto when the latter is opened, and means for sealing the folds of the wrappers on the packages.

18. In a wrapping machine the combination of a conveyer for feeding material to be wrapped into the machine, wrapper folding mechanism comprising side leaves or plates and flaps movable toward and from each other across the space between said leaves or plates, a carrier adapted to transfer the material from the conveyer to the wrapping mechanism and provided with means for operating said flaps, and means for feeding wrappers to the carrier in advance of the deposit of the material thereon.

19. In a wrapping machine the combination of a conveyer for feeding material to be wrapped into the machine, wrapper folding mechanism comprising side leaves or plates and flaps movable toward and from each other across the space between said leaves or plates, a carrier adapted to transfer the material from the conveyer to the wrapping mechanism and provided with means for operating said flaps, means for feeding wrappers to the carrier in advance of the deposit of the material thereon, and means for removing the wrapped packages from the folding mechanism.

20. In a wrapping machine the combination of a conveyer for feeding material to be wrapped into the machine, wrapper folding mechanism comprising side leaves or plates, hinged top flaps and side and bottom-end flaps, a carrier adapted to transfer the material from the conveyer to the wrapping mechanism and provided with means for operating said flaps, means for feeding wrappers to the carrier in advance of the deposit of the material thereon, and means for removing the wrapped packages from the folding mechanism.

21. In a wrapping machine the combination of a conveyer for feeding material to be wrapped into the machine, wrapper folding mechanism comprising side leaves or plates one of which is hinged and provided with package supporting and discharging arms, hinged top flaps and hinged side and bottom-end flaps, a carrier adapted to transfer the material from the conveyer to the wrapping mechanism and provided with means for operating said flaps and the hinged side leaf or plate, means for feeding wrappers to the carrier in advance of the deposit of the material thereon, and a catch for locking the top flap of the hinged side leaf or plate thereto when the latter is opened.

22. In a wrapping machine the combination of a conveyer for feeding the material to be wrapped into the machine, wrapper folding mechanism comprising side leaves or plates, top flaps and side and bottom-end flaps, a carrier adapted to transfer the material from the conveyer to the wrapping mechanism and provided with means for operating said flaps, means for feeding wrappers to the carrier in advance of the deposit of the material thereon, means for removing wrapped packages from the folding mechanism, and means for sealing the folds of the wrappers on the packages.

23. In a wrapping machine the combination of a conveyer for feeding material to be wrapped into the machine, wrapper folding mechanism comprising side leaves or plates and top flaps movable toward and from each other across the space between said leaves or plates, a carrier adapted to transfer the material from the conveyer to the wrapping mechanism and provided with means for operating said flaps, means for feeding wrappers to the carrier in advance of the deposit of the material thereon, means for removing wrapped packages from the folding mechanism, and means for sealing the folds of the wrappers on the packages.

24. In a wrapping machine the combination of a conveyer for feeding material to be wrapped into the machine, wrapper folding mechanism comprising side leaves or plates one of which is hinged and provided with package supporting and discharging arms, top and side-end flaps hinged to said leaves or plates and bottom-end flaps, a carrier adapted to transfer the material from the conveyer to the wrapping mechanism and provided with means for operating said hinged leaf or plate and said flaps, means for feeding wrappers to the carrier in advance of the deposit of the material thereon, a chute adapted to receive the packages from the folding mechanism and to turn the final end folds of the wrappers, a catch adapted to lock the top flap of the hinged leaf when the latter is opened, and means for sealing the folds of the wrappers on the packages.

25. In a wrapping machine the combination of a conveyer for feeding the material to be wrapped into the machine, wrapper folding mechanism comprising side leaves or plates, hinged top flaps and hinged side and bottom-end flaps, a carrier adapted to transfer the material from the conveyer to the wrapping mechanism and provided with means for operating said flaps, means for feeding wrappers to the carrier in advance of the deposit of the material thereon, means for removing the wrapped packages from the folding mechanism, and means for sealing the folds of the wrappers on the packages.

26. In a wrapping machine the combination of wrapper folding mechanism comprising side leaves or plates and flaps movable toward and from each other across the space between said leaves or plates, a retreating rest for temporarily supporting the articles to be wrapped, a carrier adapted to transfer the articles from said rest to the folding mechanism and provided with means for operating said flaps, a conveyer arranged to deposit the articles one at a time upon said rest, and means for feeding wrappers between said rest and carrier.

27. In a wrapping machine the combination of wrapper folding mechanism comprising side leaves or plates and flaps movable toward and from each other across the space between said leaves or plates, a rest for temporarily supporting articles to be wrapped, a carrier adapted to transfer the articles from said rest to the folding mechanism and provided with means for operating said flaps, a conveyer arranged to deposit the articles one at a time upon said rest, means for feeding wrappers between said rest and carrier, and means for removing the wrapped packages from the folding mechanism.

28. In a wrapping machine the combination of wrapper folding mechanism comprising side leaves or plates, hinged top flaps and hinged side and bottom-end flaps, a rest for temporarily supporting the articles to be wrapped, a carrier adapted to transfer the articles from said rest to the folding mechanism and provided with means for operating said flaps, a conveyer arranged to deposit the articles one at a time upon said rest, means for feeding wrappers between said rest and carrier, and means for removing the wrapped packages from the folding mechanism.

29. In a wrapping machine the combination of wrapper folding mechanism comprising side leaves or plates one of which is hinged and provided with transverse package supporting and discharging arms, top and end flaps hinged to said leaves and bottom-end flaps, movable toward and from each other between and lengthwise of said leaves, a rest for temporarily supporting the articles to be wrapped, a carrier adapted to transfer the articles from said rest to the folding mechanism and provided with means for operating said hinged leaf and said flaps, a catch for locking the top flap of the hinged leaf thereto when the latter is opened, a conveyer arranged to deposit the articles one at a time upon said rest, and means for feeding wrappers between said rest and carrier.

30. In a wrapping machine the combination of wrapper folding mechanism com prising side leaves, top and end flaps hinged thereto and hinged bottom-end flaps, a rest for temporarily supporting the articles to be wrapped, a carrier adapted to transfer the articles from said rest to the folding mechanism and provided with means for operating said flaps, a conveyer arranged to deposit the articles one at a time upon said rest, means for feeding wrappers between said rest and carrier, means for removing the wrapped packages from the machine, and means for sealing the folds of the wrappers on the packages.

31. In a wrapping machine the combination of wrapper folding mechanism comprising side leaves or plates and top flaps hinged thereto, a rest for temporarily supporting the articles to be wrapped, a carrier adapted to transfer the articles from said rest to the folding mechanism and provided with means for operating said flaps, a conveyer arranged to deposit the articles one at a time upon said rest, means for feeding wrappers between said rest and carrier, means for removing the wrapped packages from the machine, and means for sealing the folds of the wrappers on the packages.

32. In a wrapping machine the combination of wrapper folding mechanism comprising side leaves or plates one of which is hinged and provided with package supporting and discharging arms, top and end flaps hinged to said leaves, hinged bottom-end flaps, a catch for locking the top flap of the hinged leaf thereto when the latter is opened, a rest for temporarily supporting the articles to be wrapped, a carrier adapted to transfer the articles from said rest to the folding mechanism and provided with means for operating said hinged leaf and said flaps, a conveyer arranged to deposit the articles one at a time upon said rest, means for feeding wrappers between said rest and carrier, and means for sealing the folds of the wrappers on the packages.

33. In a wrapping machine the combination of wrapper folding mechanism comprising side leaves or plates, hinged top flaps and hinged side and bottom-end flaps, a rest for temporarily supporting the articles to be wrapped, a carrier adapted to transfer the articles from said rest to the folding mechanism and provided with means for operating said flaps, a conveyer arranged to deposit the articles one at a time upon said rest, means for feeding wrappers between said rest and carrier, means for discharging the wrapped packages from the machine, and means for sealing the folds of the wrappers on the packages.

34. In a wrapping machine the combination of wrapper folding mechanism comprising side leaves or plates and flaps movable toward and from each other across the space between said leaves or plates, a retreating rest for temporarily supporting the articles to be wrapped, a carrier adapted to transfer such articles from said rest to said folding mechanism and provided with means for operating said flaps, a conveyer adapted to feed the articles one at a time upon said rest, and a wrapper guide arranged to support wrappers between said rest and folding mechanism in the path of said carrier.

35. In a wrapping machine the combination of wrapper folding mechanism comprising side leaves or plates and flaps movable toward and from each other across the space between said leaves or plates, a rest for temporarily supporting the articles to be wrapped, a carrier adapted to transfer such articles from said rest to said folding mechanism and provided with means for operating said flaps, a conveyer adapted to feed the articles one at a time upon said rest, a wrapper guide arranged to support wrappers between said rest and the folding mechanism in the path of said carrier, and means for discharging the wrapped packages from the folding mechanism.

36. In a wrapping machine the combination of wrapper folding mechanism comprising side leaves or plates, hinged top flaps and hinged side and bottom-end flaps, a rest for temporarily supporting the articles to be wrapped, a carrier adapted to transfer such articles from said rest to said folding mechanism and provided with means for operating said flaps, a conveyer adapted to feed the articles one at a time upon said rest, a wrapper guide arranged to support wrappers between said rest and folding mechanism in the path of said carrier, and means for discharging the wrapped packages from the folding mechanism.

37. In a wrapping machine the combination of wrapper folding mechanism comprising side leaves or plates one of which is hinged and provided with package supporting and discharging arms, top and end flaps hinged to said leaves and hinged bottom flaps, a catch adapted to lock the top flap of the hinged leaf thereto when the latter is opened, a rest for temporarily supporting the articles to be wrapped, a carrier adapted to transfer such articles from said rest to said folding mechanism and provided with means for operating said hinged leaf and said flaps, a conveyer adapted to convey the articles one at a time upon said rest, and a wrapper guide arranged to support wrappers between said rest and folding mechanism in the path of said carrier.

38. In a wrapping machine the combination of wrapper folding mechanism comprising side leaves or plates provided with hinged top and end flaps and hinged bottom-end flaps, a rest for temporarily supporting the articles to be wrapped, a carrier adapted to transfer such articles from said rest to said folding mechanism and provided with means for operating said flaps, a conveyer adapted to feed the articles one at a time upon said rest, a wrapper guide arranged to support wrappers between said rest and folding mechanism in the path of said carrier, means for discharging the wrapped packages from the folding mechanism, and means for sealing the folds of the wrappers on the packages.

39. In a wrapping machine the combination of wrapper folding mechanism comprising side leaves or plates provided with hinged top flaps, a rest for temporarily supporting the articles to be wrapped, a carrier adapted to transfer such articles from said rest to said folding mechanism and provided with means for operating said flaps, a conveyer adapted to feed the articles one at a time upon said rest, a wrapper guide arranged to support wrappers between said rest and folding mechanism in the path of said carrier, means for discharging the wrapped packages from the folding mechanism, and means for sealing the folds of the wrappers on the packages.

40. In a wrapping machine the combination of wrapper folding mechanism comprising side leaves or plates one of which is hinged and provided with package supporting and discharging arms, top and end flaps hinged to said plates and hinged bottom flaps, a catch adapted to lock the top flap of the hinged leaf thereto when the latter is opened, a rest for temporarily supporting the articles to be wrapped, a carrier adapted to transfer such articles from said rest to said folding mechanism and provided with means for operating said hinged leaf and said flaps, a conveyer adapted to feed the articles one at a time upon said rest, a wrapper guide arranged to support wrappers between said rest and folding mechanism in the path of said carrier, and means for sealing the folds of the wrappers on the packages.

41. In a wrapping machine the combination of wrapper folding mechanism comprising side leaves or plates provided with hinged top and end flaps and hinged bottom flaps, a rest for temporarily supporting the articles to be wrapped, a carrier adapted to transfer such articles from said rest to said folding mechanism and provided with means for operating said flaps, a conveyer adapted to feed the articles one at a time upon said rest, a wrapper guide arranged to support wrappers between said rest and folding mechanism in the path of said carrier, means for discharging the wrapped packages from the folding mechanism, and means for sealing the folds of the wrappers on the packages.

42. In a wrapping machine the combination of wrapper folding mechanism comprising side leaves or plates and flaps movable toward and from each other across the space between said leaves or plates, a retreating rest for temporarily supporting the articles to be wrapped, a carrier upon which such articles are deposited and transferred from said rest to said folding mechanism and which is adapted to operate said flaps, and means for feeding wrappers between said rest and carrier.

43. In a wrapping machine the combination of wrapper folding mechanism comprising side leaves or plates provided with hinged top flaps, a rest for temporarily supporting the articles to be wrapped, a carrier adapted to transfer such articles from said rest to said folding mechanism, means for feeding wrappers between said rest and carrier, and means for discharging wrapped packages from the folding mechanism.

44. In a wrapping machine the combination of wrapper folding mechanism comprising side leaves provided with hinged top and end flaps and hinged bottom flaps, a rest for temporarily supporting the articles to be wrapped, a carrier adapted to transfer such articles from said rest to said folding mechanism, means for feeding wrappers between said rest and carrier, and means for discharging wrapped packages from the folding mechanism.

45. In a wrapping machine the combination of wrapper folding mechanism comprising side leaves provided with hinged top and end flaps and hinged bottom flaps, one of said leaves being hinged and provided with package supporting and discharging arms, a rest for temporarily supporting the articles to be wrapped, a carrier adapted to transfer such articles from said rest to said folding mechanism and provided with means for operating said hinged leaf and said flaps, a catch for locking the top flap of the hinged leaf thereto when the latter is opened, and means for feeding wrappers between said rest and carrier.

46. In a wrapping machine the combination of wrapper folding mechanism comprising side leaves provided with hinged top and end flaps and hinged bottom flaps, a rest for temporarily supporting the articles to be wrapped, a carrier adapted to transfer said articles from said rest to said folding mechanism, means for feeding wrappers between said rest and carrier, means for discharging wrapped packages from the folding mechanism, and means for sealing the folds of the wrappers on the packages.

47. In a wrapping machine the combination of wrapper folding mechanism comprising side leaves provided with hinged top flaps, a rest for temporarily supporting the articles to be wrapped, a carrier adapted to transfer such articles from said rest to said folding mechanism, means for feeding wrappers between said rest and carrier, means for discharging wrapped packages from the folding mechanism, and means for sealing the folds of the wrappers on the packages.

48. In a wrapping machine the combination of wrapper folding mechanism comprising side leaves provided with hinged top and end flaps, one of said leaves being hinged and provided with package supporting and discharging arms, and hinged bottom flaps, a rest for temporarily supporting the articles to be wrapped, a carrier adapted to transfer such articles from said rest to said folding mechanism and provided with means for operating said hinged leaf and said flaps, means for feeding wrappers between said rest and carrier, a catch for locking the top flap of the hinged leaf thereto when the latter is opened, and means for sealing the folds of the wrappers on the packages.

49. In a wrapping machine the combination of wrapper folding mechanism comprising side leaves provided with hinged top and end flaps and hinged bottom flaps, a rest for temporarily supporting the articles to be wrapped, a carrier adapted to transfer such articles from said rest to said folding mechanism and to operate said flaps, means for feeding wrappers between said rest and carrier, means for discharging wrapped packages from the folding mechanism, and means for sealing the folds of the wrappers on the packages.

50. In a wrapping machine the combination of a carrier, and wrapper folding mechanism comprising flaps movable toward and from each other transversely to the path of said carrier which is provided with means for operating said flaps to fold the wrapper.

51. In a wrapping machine the combination of a carrier, wrapper folding mechanism comprising flaps movable toward and from each other transversely to the path of said carrier which is provided with means for operating said flaps to fold the wrapper, and means for discharging wrapped packages from the folding mechanism.

52. In a wrapping machine the combination of a carrier, wrapper folding mechanism comprising flaps movable toward and from each other transversely to the path of said carrier which is provided with means for operating said flaps to fold the wrapper, means for discharging the wrapped packages from the folding mechanism, and means for sealing the folds of the wrappers on the packages.

53. In a wrapping machine the combination of a carrier, wrapper folding mechanism comprising flaps movable toward and from each other across the path of said carrier which is provided with means for operating said flaps, means for discharging wrapped packages from the folding mechanism, and means for holding one of said flaps closed on the package while it is being discharged.

54. In a wrapping machine the combination of a carrier, wrapper folding mechanism comprising flaps movable toward and from each other across the path of said carrier and provided with means for operating said flaps, swinging package supporting and discharging arms on which the packages rest while being wrapped, a catch for holding one of said flaps closed upon the packages while they are being discharged from the folding mechanism, and means for sealing the folds of the wrappers on the packages.

55. In a wrapping machine the combination of a carrier and wrapper folding mechanism comprising flaps movable toward and from each other sidewise across the path of the carrier, and transverse end flaps movable lengthwise of the other flaps, said carrier being provided with means for operating said flaps.

56. In a wrapping machine the combination of a carrier, wrapper folding mechanism comprising flaps movable toward and from each other sidewise across the path of the carrier and transverse end flaps movable lengthwise of the other flaps, said carrier being provided with means for operating said flaps, and a delivery chute adapted to receive the packages from the folding mechanism and to turn the final end folds of the wrappers.

57. In a wrapping machine the combination of a carrier, wrapper folding mechanism comprising flaps movable toward and from each other sidewise across the path of said carrier and transverse end flaps movable lengthwise of the other flaps, hinged package supporting and discharging arms on which the packages rest while being wrapped, a catch for holding one of the side flaps closed while the packages are being discharged from the folding mechanism, and a delivery chute arranged to receive the packages from the folding mechanism and to lay the final end folds of the wrappers thereon.

58. In a wrapping machine the combination of a carrier, wrapper folding mechanism comprising flaps movable toward and from each other sidewise across the path of said carrier and transverse end flaps movable lengthwise of the other flaps, hinged package supporting and discharging arms on which the packages rest while being wrapped, a catch for holding one of the side flaps closed while the packages are being discharged from the folding mechanism, and a delivery chute arranged to receive the packages from the folding mechanism and to lay the final end folds of the wrappers thereon, and provided with means for sealing the folds of the wrappers on the packages.

59. In a wrapping machine the combination of a retreating rest for temporarily supporting the articles to be wrapped, a carrier adapted to transfer the articles one at a time from said rest, and wrapper folding mechanism comprising flaps movable toward and from each other across the path of the carrier which is provided with means for operating said flaps.

60. In a wrapping machine the combination of a rest for temporarily supporting the articles to be wrapped, a carrier adapted to transfer the articles one at a time from said rest, wrapper folding mechanism comprising flaps movable toward and from each other across the path of the carrier which is provided with means for operating said flaps, and means for discharging the wrapped packages from the folding mechanism.

61. In a wrapping machine the combination of a rest for temporarily supporting the articles to be wrapped, a carrier adapted to transfer the articles one at a time from said rest, wrapper folding mechanism comprising flaps movable toward and from each other across the path of the carrier which is provided with means for operating said flaps, means for discharging the wrapped packages from the folding mechanism, and means for sealing folds of the wrappers on the packages.

62. In a wrapping machine the combination of a rest for temporarily supporting the articles to be wrapped, a carrier adapted to transfer the articles one at a time from said rest, wrapper folding mechanism comprising hinged package supporting and discharging arms and flaps movable toward and from each other across the path of the carrier which is provided with means for operating said flaps, and a catch for locking one of said flaps in closed relation to said arms while they are being turned into discharging position.

63. In a wrapping machine the combination of a rest for temporarily supporting the articles to be wrapped, wrapper folding mechanism comprising hinged package supporting and discharging arms and flaps movable toward and from each other over said arms, and a catch for locking one of said flaps in closed relation to said arms while they are being turned into discharging position, a carrier adapted to transfer the articles one at a time from said rest to said folding mechanism and provided with means for operating said flaps and arms, and means for sealing the folds of the wrappers on the packages.

64. In a wrapping machine the combination of a rest for temporarily supporting the articles to be wrapped, wrapper folding mechanism comprising hinged top flaps movable toward and from each other over the articles to be wrapped and hinged bottom flaps movable toward and from each other lengthwise of the other flaps, and a carrier adapted to transfer the articles one at a time from said rest to said folding mechanism and provided with means for operating said flaps.

65. In a wrapping machine the combination of a rest for temporarily supporting the articles to be wrapped, wrapper folding mechanism comprising hinged top flaps movable toward and from each other across the packages and hinged bottom flaps movable toward and from each other lengthwise of the other flaps, a carrier adapted to transfer the articles one at a time from said rest to said folding mechanism and provided with means for operating said flaps, and means for discharging the wrapped packages from the folding mechanism.

66. In a wrapping machine the combination of a rest for temporarily supporting the articles to be wrapped, wrapper folding mechanism located below said rest and comprising hinged top flaps movable toward and from each other across the path of the packages and hinged bottom flaps movable toward and from each other lengthwise of the top flaps, a carrier adapted to transfer the articles from said rest to the folding mechanism and provided with means for operating said flaps, means for discharging wrapped packages from the folding mechanism, and means for sealing the folds of the wrappers on the packages.

67. In a wrapping machine the combination of a rest for temporarily supporting the articles to be wrapped, wrapper folding mechanism located below said rest and comprising a hinged support for the packages, hinged top flaps movable toward and from each other across said support and hinged bottom flaps movable toward and from each other lengthwise of the other flaps, a carrier adapted to transfer the articles one at a time from said rest to said support and provided with means for operating said support and said flaps, and a catch for holding one of the side flaps closed with relation to said support while it is being turned into discharging position.

68. In a wrapping machine the combination of a rest for temporarily supporting the articles to be wrapped, wrapper folding mechanism comprising a hinged support, hinged top flaps movable toward and from each other across said support and hinged bottom flaps movable toward and from each other lengthwise of the other flaps, a carrier adapted to transfer articles one at a time from said rest to said support and provided with means for operating said support and said flaps, a catch for locking one of the side flaps closed with relation to said support while it is being turned into discharging position, and means for sealing the folds of wrappers on the packages.

69. In a wrapping machine the combination of a retreating rest for temporarily supporting the articles to be wrapped, a carrier adapted to transfer the articles one at a time from said rest, wrapper folding mechanism comprising flaps movable toward and from each other across the path of the carrier which is provided with means for operating said flaps, and means for feeding wrappers between said rest and carrier.

70. In a wrapping machine the combination of a rest for temporarily supporting the articles to be wrapped, a carrier adapted to transfer the articles one at a time from said rest, wrapper folding mechanism comprising flaps movable toward and from each other across the path of the carrier which is provided with means for operating said flaps, means for feeding wrappers between said rest and carrier, and means for discharging the wrapped packages from the folding mechanism.

71. In a wrapping machine the combination of a rest for temporarily supporting the articles to be wrapped, a carrier adapted to transfer the articles one at a time from said rest, wrapper folding mechanism comprising flaps movable toward and from each other across the path of the carrier which is provided with means for operating said flaps, means for feeding wrappers between said rest and carrier, means for discharging wrapped packages from the folding mechanism, and means for sealing folds of the wrappers on the packages.

72. In a wrapping machine the combination of a rest for temporarily supporting the articles to be wrapped, wrapper folding mechanism comprising a hinged support and top flaps movable toward and from each other across said support, a carrier adapted to transfer the articles one at a time from said rest to said folding mechanism and provided with means for operating said support and said flaps, a catch for locking one of said flaps in closed relation to said support while it is being turned into discharging position, and means for feeding wrappers between said rest and carrier.

73. In a wrapping machine the combination of a rest for temporarily supporting the articles to be wrapped, wrapper folding mechanism comprising a hinged support and top flaps movable toward and from each other across said support, a carrier adapted to transfer the articles one at a time from said rest to said folding mechanism and provided with means for operating said support and said flaps, a catch for locking one of said flaps in closed relation to said support while it is being turned into discharging position, means for feeding wrappers between said rest and carrier, and means for sealing folds of the wrappers on the packages.

74. In a wrapping machine the combination of a rest for temporarily supporting the articles to be wrapped, folding mechanism comprising hinged top flaps movable toward and from each other and hinged bottom flaps movable toward and from each other lengthwise of the top flaps, a carrier adapted to transfer the articles one at a time from said rest to said folding mechanism and provided with means for operating said flaps, and means for feeding wrappers between said rest and carrier.

75. In a wrapping machine the combination of a rest for temporarily supporting the articles to be wrapped, folding mechanism comprising hinged top flaps movable toward and from each other and hinged bottom flaps movable toward and from each other lengthwise of the top flaps, a carrier adapted to transfer the articles one at a time from said rest to said folding mechanism and provided with means for operating said flaps, means for feeding wrappers between said rest and carrier, and means for discharging the wrapped packages from the folding mechanism.

76. In a wrapping machine the combination of a rest for temporarily supporting the articles to be wrapped, folding mechanism comprising hinged top flaps movable toward and from each other and hinged bottom flaps movable toward and from each other lengthwise of the top flaps, a carrier adapted to transfer the articles one at a time from said rest to said folding mechanism and provided with means for operating said flaps, means for feeding wrappers between said rest and carrier, means for discharging the wrapped packages from the folding mechanism, and means for sealing folds of the wrappers on the packages.

77. In a wrapping machine the combination of a rest for temporarily supporting the articles to be wrapped, wrapper folding mechanism comprising a hinged support, hinged top flaps and hinged bottom flaps movable toward and from each other lengthwise of the top flaps, a carrier adapted to transfer the articles one at a time from said rest to the folding mechanism, a catch for locking one of the top flaps in closed relation to said support while it is being turned into discharging position, and means for feeding wrappers between said rest and carrier.

78. In a wrapping machine the combination of a rest for temporarily supporting the articles to be wrapped, wrapper folding mechanism comprising a hinged support, hinged top flaps and hinged bottom flaps movable toward and from each other lengthwise of the top flaps, a carrier adapted to transfer the articles one at a time from said rest to the folding mechanism, a catch for locking one of the top flaps in closed relation to said support while it is being turned into discharging position, means for feeding wrappers between said rest and carrier, and means for sealing folds of the wrappers on the packages.

79. In a wrapping machine the combination of a retreating rest for temporarily supporting the material to be wrapped, a carrier for transferring the material from said rest, wrapper folding mechanism comprising flaps movable toward and from each other across the path of the carrier which is provided with means for operating said flaps, and a conveyer for feeding the material to said rest.

80. In a wrapping machine the combination of a rest for temporarily supporting the material to be wrapped, a carrier for transferring the material from said rest, wrapper folding mechanism comprising flaps movable toward and from each other across the path of the carrier which is provided with means for operating said flaps, a conveyer for feeding the material to said rest, and means for discharging the wrapped package from the folding mechanism.

81. In a wrapping machine the combination of a rest for temporarily supporting the material to be wrapped, a carrier for transferring the material from said rest, wrapper folding mechanism comprising flaps movable toward and from each other across the path of the carrier which is provided with means for operating said flaps, a conveyer for feeding the material to said rest, means for discharging the wrapped packages from the folding mechanism, and means for sealing folds of the wrappers on the packages.

82. In a wrapping machine the combination of a rest for temporarily supporting the material to be wrapped, wrapper folding mechanism comprising a hinged support and hinged flaps movable toward and from each other across said support, a carrier for transferring the material from said rest to the folding mechanism and provided with means for operating said support and said flaps, means for locking one of said flaps in closed relation to said support while it is being turned into discharging position, and a conveyer for feeding the material to said rest.

83. In a wrapping machine the combination of a rest for temporarily supporting the material to be wrapped, wrapper folding mechanism comprising a hinged support and hinged flaps movable toward and from each other across said support, a carrier for transferring the material from said rest to the folding mechanism and provided with means for operating said support and said flaps, means for locking one of said flaps in closed relation to said support while it is being turned into discharging position, a conveyer for feeding the material to said rest, and means for sealing folds of the wrappers on the packages.

84. In a wrapping machine the combination of a rest for temporarily supporting the material to be wrapped, wrapper folding mechanism located below said rest and comprising hinged top flaps movable transversely toward and from each other and hinged bottom flaps movable toward and from each other lengthwise of the top flaps, a carrier adapted to transfer the material from said rest to the folding mechanism and provided with means for operating said flaps, and a conveyer for feeding the material to said rest.

85. In a wrapping machine the combination of a rest for temporarily supporting the material to be wrapped, wrapper folding mechanism located below said rest and comprising hinged top flaps movable transversely toward and from each other and hinged bottom flaps movable toward and from each other lengthwise of the top flaps, a carrier adapted to transfer the material from said rest to the folding mechanism and provided with means for operating said flaps, a conveyer for feeding the material to said rest, and means for discharging the wrapped packages from the folding mechanism.

86. In a wrapping machine the combination of a rest for temporarily supporting the material to be wrapped, wrapper folding mechanism located below said rest and comprising hinged top flaps movable transversely toward and from each other and hinged bottom flaps movable toward and from each other lengthwise of the top flaps, a carrier adapted to transfer the material from said rest to the folding mechanism and provided with means for operating said flaps, a conveyer for feeding the material to said rest, means for discharging the wrapped packages from the folding mechanism, and means for sealing folds of the wrappers on the packages.

87. In a wrapping machine the combination of a rest for temporarily supporting the material to be wrapped, folding mechanism comprising a hinged support, hinged top flaps movable transversely toward and from each other and hinged bottom flaps movable toward and from each other lengthwise of the top flaps, a carrier adapted to transfer the material from said rest to the folding mechanism and provided with means for operating said support and said flaps, a catch for locking one of the top flaps in closed relation to said support while it is being turned into discharging position, and a conveyer for feeding the material to said rest.

88. In a wrapping machine the combination of a rest for temporarily supporting the material to be wrapped, folding mechanism comprising a hinged support, hinged top flaps movable transversely toward and from each other and hinged bottom flaps movable toward and from each other lengthwise of the top flaps, a carrier adapted to transfer the material from said rest to the folding mechanism and provided with means for operating said support and said flaps, a catch for locking one of the top flaps in closed relation to said support while it is being turned into discharging position, a conveyer for feeding the material to said rest, and means for sealing folds of the wrappers on the packages.

89. In a wrapping machine the combination of a retreating rest for temporarily supporting the material to be wrapped, a carrier for transferring such material from said rest, wrapper folding mechanism comprising flaps movable toward and from each other across the path of said carrier which is provided with means for operating said flaps, a conveyer for feeding the material to said rest, and means for feeding wrappers between the rest and carrier.

90. In a wrapping machine the combination of a rest for temporarily supporting the material to be wrapped, a carrier for transferring such material from said rest, wrapper folding mechanism comprising flaps movable toward and from each other across the path of said carrier which is provided with means for operating said flaps, a conveyer for feeding the material to said rest, means for feeding wrappers between the rest and carrier, and means for discharging the wrapped packages from the folding mechanism.

91. In a wrapping machine the combination of a rest for temporarily supporting the material to be wrapped, a carrier for transferring such material from said rest, wrapper folding mechanism comprising flaps movable toward and from each other across the path of said carrier which is provided with means for operating said flaps, a conveyer for feeding the material to said rest, means for feeding wrappers between the rest and carrier, means for discharging the wrapped packages from the folding mechanism, and means for sealing folds of the wrappers on the packages.

92. In a wrapping machine the combination of a rest for temporarily supporting the material to be wrapped, folding mechanism comprising a hinged support, top flaps movable toward and from each other across said support and a catch for locking one of said flaps in closed relation to said support while it is being turned into discharging position, a carrier adapted to transfer the material from said rest to said folding mechanism and provided with means for operating said support and said flaps, a conveyer for feeding the material to said rest, and means for feeding wrappers between the rest and carrier.

93. In a wrapping machine the combination of a rest for temporarily supporting the material to be wrapped, folding mechanism comprising a hinged support, top flaps movable toward and from each other across said support and a catch for locking one of said flaps in closed relation to said support while it is being turned into discharging position, a carrier adapted to transfer the material from said rest to said folding mechanism and provided with means for operating said support and said flaps, a conveyer for feeding the material to said rest, means for feeding wrappers between the rest and carrier, and means for sealing folds of the wrappers on the packages.

94. In a wrapping machine the combination of a rest for temporarily supporting the material to be wrapped, wrapper folding mechanism comprising hinged top flaps movable transversely toward and from each other and hinged bottom flaps movable toward and from each other lengthwise of the top flaps, a carrier adapted to transfer the material from said rest to the folding mechanism and provided with means for operating said flaps, a conveyer for conveying the material to said rest, and means for feeding wrappers between the rest and carrier.

95. In a wrapping machine the combination of a rest for temporarily supporting the material to be wrapped, wrapper folding mechanism comprising hinged top flaps movable transversely toward and from each other and hinged bottom flaps movable toward and from each other lengthwise of the top flaps, a carrier adapted to transfer the material from said rest to the folding mechanism and provided with means for operating said flaps, a conveyer for conveying the material to said rest, means for feeding wrappers between the rest and carrier, and means for discharging wrapped packages from the folding mechanism.

96. In a wrapping machine the combination of a rest for temporarily supporting the material to be wrapped, wrapper folding mechanism comprising hinged top flaps movable transversely toward and from each other and hinged bottom flaps movable toward and from each other lengthwise of the top flaps, a carrier adapted to transfer the material from said rest to the folding mechanism and provided with means for operating said flaps, a conveyer for conveying the material to said rest, means for feeding wrappers between the rest and carrier, means for discharging wrapped packages from the folding mechanism, and means for sealing folds of the wrappers on the packages.

97. In a wrapping machine the combination of a rest for temporarily supporting the material to be wrapped, wrapper folding mechanism comprising a hinged support, top flaps movable transversely toward and from each other, bottom flaps movable toward and from each other lengthwise of the top flaps and a catch for locking one of the top flaps in closed relation to said support while it is being turned into discharging position, a carrier adapted to transfer the material from said rest to the folding mechanism and provided with means for operating said support and said flaps, a conveyer for feeding the material to said rest, and means for feeding wrappers between the rest and carrier.

98. In a wrapping machine the combination of a rest for temporarily supporting the material to be wrapped, wrapper folding mechanism comprising a hinged support, top flaps movable transversely toward and from each other, bottom flaps movable toward and from each other lengthwise of the top flaps and a catch for locking one of the top flaps in closed relation to said support while it is being turned into discharging position, a carrier adapted to transfer the material from said rest to the folding mechanism and provided with means for operating said support and said flaps, a conveyer for feeding the material to said rest, means for feeding wrappers between the rest and carrier, and means for sealing folds of the wrappers on the packages.

99. In a wrapping machine the combination of a conveyer for feeding the material to be wrapped into the machine, wrapper folding mechanism comprising flaps movable toward and from each other across the path of the material through the machine, a carrier adapted to transfer the material from the conveyer to the folding mechanism and provided with means for operating said flaps, and means for feeding wrappers to the carrier between the conveyer and folding mechanism.

100. In a wrapping machine the combination of a conveyer for feeding the material to be wrapped into the machine, wrapper folding mechanism comprising flaps movable transversely toward and from each other across the path of the material through the machine, a carrier adapted to transfer the material from the conveyer to the folding mechanism and provided with means for operating said flaps, means for feeding wrappers to the carrier between the conveyer and folding mechanism, and means for discharging wrapped packages from the folding mechanism.

101. In a wrapping machine the combination of a conveyer for feeding material to be wrapped into the machine, wrapper folding mechanism comprising flaps movable transveresely toward and from each other across the path of the material through the machine, a carrier adapted to transfer the material from the conveyer to the folding mechanism and provided with means for operating said flaps, means for feeding wrappers to the carrier between the conveyer and folding mechanism, means for discharging wrapped packages from the folding mechanism, and means for sealing folds of the wrappers on the packages.

102. In a wrapping machine the combination of a conveyer for feeding the material to be wrapped into the machine, wrapper folding mechanism comprising a hinged support, flaps movable transversely toward and from each other across said support and a catch adapted to lock one of said flaps in closed position with relation to said support while it is being turned into discharging position, a carrier adapted to transfer the material from the conveyer to the folding mechanism and provided with means for operating said support and said flaps, and means for feeding wrappers to the carrier between the conveyer and folding mechanism.

103. In a wrapping machine the combination of a conveyer for feeding the material to be wrapped into the machine, wrapper folding mechanism comprising a hinged support, flaps movable transversely toward and from each other across said support and a catch adapted to lock one of said flaps in closed position with relation to said support while it is being turned into discharging position, a carrier adapted to transfer the material from the conveyer to the folding mechanism and provided with means for operating said support and said flaps, means for feeding wrappers to the carrier between the conveyer and folding mechanism, and means for sealing folds of the wrappers on the packages.

104. In a wrapping machine the combination of a conveyer for feeding the material to be wrapped into the machine, wrapper folding mechanism comprising top flaps movable transversely toward and from each other across the path of the material through the machine and bottom flaps movable toward and from each other lengthwise of the top flaps, a carrier adapted to transfer the material from the conveyer to the folding mechanism and provided with means for operating said flaps, and means for feeding wrappers to the carrier between the conveyer and folding mechanism.

105. In a wrapping machine the combination of a conveyer for feeding the material to be wrapped into the machine, wrapper folding mechanism comprising top flaps movable transversely toward and from each other across the path of the material through the machine and bottom flaps movable toward and from each other lengthwise of the top flaps, a carrier adapted to transfer the material from the conveyer to the folding mechanism and provided with means for operating said flaps, means for feeding wrappers to the carrier between the conveyer and folding mechanism, and means for discharging wrapped packages from the folding mechanism.

106. In a wrapping machine the combination of a conveyer for feeding the material to be wrapped into the machine, wrapper folding mechanism comprising top flaps movable transversely toward and from each other across the path of the material through the machine and bottom flaps movable toward and from each other lengthwise of the top flaps, a carrier adapted to transfer the material from the conveyer to the folding mechanism and provided with means for operating said flaps, means for feeding wrappers to the carrier between the conveyer and folding mechanism, means for discharging wrapped packages from the folding mechanism, and means for sealing folds of the wrappers on the packages.

107. In a wrapping machine the combination of a conveyer for feeding the material to be wrapped into the machine, wrapper folding mechanism comprising a hinged support, top flaps movable transversely toward and from each other across said support and bottom flaps movable toward and from each other lengthwise of the top flaps and a catch for locking one of the top flaps in closed relation to said support while it is being turned into discharging position, a carrier adapted to transfer the material from the conveyer to the folding mechanism and provided with means for operating said support and said flaps, and means for feeding wrappers to the carrier between the conveyer and folding mechanism.

108. In a wrapping machine the combination of a conveyer for feeding the material to be wrapped into the machine, wrapper folding mechanism comprising a hinged support, top flaps movable transversely toward and from each other across said support, bottom flaps movable toward and from each other lengthwise of the top flaps and a catch for locking one of the top flaps in closed relation to said support while it is being turned into discharging position, a carrier adapted to transfer the material from the conveyer to the folding mechanism and provided with means for operating said support and said flaps, means for feeding wrappers to the carrier between the conveyer and folding mechanism, and means for sealing folds of the wrappers on the packages.

109. In a wrapping machine the combination of a frame provided with a retreating rest for temporarily supporting the articles to be wrapped, wrapper folding mechanism located below said rest, a guide for wrappers between said rest and folding mechanism, a vertically reciprocating carrier upon which the articles are deposited and transferred with the wrappers from said rest and guide to the folding mechanism below and means for operating said folding mechanism as the carrier moves past the same.

110. In a wrapping machine the combination of a laterally movable rest for temporarily supporting the articles to be wrapped, wrapper folding mechanism located below said rest, a guide for wrappers between said rest and folding mechanism, a vertically movable carrier adapted to transfer the articles and wrappers from said rest and guide to the folding mechanism, a conveyer adapted to deposit the articles one at a time upon said rest, and means for feeding the wrappers as they are required to said guide.

111. In a wrapping machine the combination of a laterally retreating rest for temporarily supporting the articles to be wrapped, wrapper folding mechanism located below said rest, a wrapper guide between said rest and folding mechanism, a vertically movable carrier for transferring the articles and wrappers from said rest and guide to the folding mechanism, a conveyer adapted to deliver the articles to be wrapped upon said rest, a feed roller for intermittently supplying paper from a roll to said support, and a cutter for severing the wrappers from the roll.

112. In a wrapping machine the combination of a vertically movable carrier, and folding mechanism arranged to receive articles with their wrappers one at a time from the carrier and comprising hinged top and end flaps said carrier being provided with means for automatically closing and opening said flaps in the proper order as the carrier moves downward and upward.

113. In a wrapping machine the combination of a vertically movable carrier, and folding mechanism arranged to receive from the carrier, one at a time, articles to be wrapped with their wrappers, and comprising side leaves having hinged top and end flaps, one of said leaves being hinged and provided with transverse package supporting and discharging arms, and the carrier being provided with means for automatically closing and opening the flaps and movable leaf in the required sequence as said carrier moves downward and upward.

114. In a wrapping machine the combination of folding mechanism comprising swinging bottom-end flaps and side leaves having hinged end and top flaps, and a vertically movable carrier adapted to convey, one at a time, the articles to be wrapped with their wrappers to the folding mechanism and provided with means for closing and opening said flaps in the required order.

115. In a wrapping machine the combination of folding mechanism comprising side leaves having hinged top and end flaps, a vertically movable head and vertically swinging bottom end flaps pivotally connected with said head, and a vertically movable carrier adapted to convey to the folding mechanism the articles to be wrapped with the wrappers therefor and provided with means for closing said flaps in the required order as the carrier descends.

116. In a wrapping machine the combination of folding mechanism comprising side leaves one of which is hinged to open outward and downward and is provided with transverse package supporting and discharging arms, top and end flaps hinged to said leaves, a vertically movable head adjacent to said leaves and vertically swinging end flaps pivotally connected with said head, and a vertically reciprocating carrier adapted to convey the wrappers with the articles to be wrapped to the folding mechanism and provided with means for closing the movable leaf and the flaps in the proper order as it descends and for opening the movable leaf as it ascends.

117. In a wrapping machine the combination of folding mechanism comprising side leaves having vertically hinged end folders provided with closing cams, springs tending to open said folders, vertically swinging top folders hinged to the outer sides of said leaves and arranged by engagement with said cams to close the end folders, levers arranged to close said top folders, and a vertically reciprocating carrier adapted in its descent to convey wrappers with the articles to be wrapped to the folding mechanism and provided with means for operating said levers.

118. In a wrapping machine the combination of folding mechanism comprising vertically disposed parallel leaves, having laterally swinging end folders provided with closing cams, springs tending to open said folders, one of said leaves being hinged to open outward and downward and provided with transverse package supporting and discharging arms, folders hinged to the outer sides of said leaves and adapted when closed to engage with said cams and to close said end folders, levers for closing the top folders, a vertically movable head provided with vertically swinging end folders, and a vertically reciprocating carrier adapted in its descent to convey wrappers with the articles to be wrapped to the folding mechanism and provided with means to first close the vertically swinging end folders, then operate said levers to close the top and the side end folders and in its ascent to open the movable leaf.

119. In a wrapping machine the combination of a carrier, wrapper folding mechanism comprising flaps movable toward and from each other across the path of said carrier, said carrier being adapted to operate said flaps as it moves past the same.

In witness whereof I hereto affix my signature in presence of two witnesses.

BRUCE V. EDWARDS.

Witnesses:
CHAS. L. GOSS,
FRED PALM.

---

Copies of this patent may be obtained for five cents each, by addressing the "Commissioner of Patents, Washington, D. C."